(12) United States Patent
Nevatia

(10) Patent No.: US 9,027,320 B2
(45) Date of Patent: May 12, 2015

(54) HOLLOW ORNAMENTS AND PROCESS FOR PRODUCING THEM

(71) Applicant: M/s Sunjewels International Pvt. Ltd., Mumbai (IN)

(72) Inventor: Neeraj Nevatia, Mumbai (IN)

(*) Notice: Subject to any disclaimer, the term of this patent is extended or adjusted under 35 U.S.C. 154(b) by 76 days.

(21) Appl. No.: 13/918,966

(22) Filed: Jun. 16, 2013

(65) Prior Publication Data

US 2014/0305093 A1 Oct. 16, 2014

(30) Foreign Application Priority Data

Apr. 10, 2013 (IN) .................. 1345/MUM/2013

(51) Int. Cl.
| | |
|---|---|
| *B21L 5/00* | (2006.01) |
| *A44C 11/00* | (2006.01) |
| *B21L 5/02* | (2006.01) |
| *B21L 11/00* | (2006.01) |
| *F16G 13/16* | (2006.01) |
| *A44C 27/00* | (2006.01) |
| *B22D 23/02* | (2006.01) |
| *B22D 25/02* | (2006.01) |

(52) U.S. Cl.
CPC . *A44C 11/00* (2013.01); *B21L 5/02* (2013.01); *B21L 11/00* (2013.01); *F16G 13/16* (2013.01); *A44C 27/00* (2013.01); *B22D 23/02* (2013.01); *B22D 25/026* (2013.01)

(58) Field of Classification Search
CPC .......... A44C 11/00; A44C 27/00; B21L 5/02; B21L 11/00; F16G 13/16; B22D 23/02; B22D 25/026
USPC ............................ 59/1, 10, 11, 12, 35.1, 78.1
See application file for complete search history.

(56) References Cited

U.S. PATENT DOCUMENTS

| | | | | |
|---|---|---|---|---|
| 1,550,683 | A * | 8/1925 | Erikson | 59/78.1 |
| 3,427,801 | A * | 2/1969 | McLeish | 59/1 |
| 3,813,478 | A * | 5/1974 | Ervin | 59/35.1 |
| 4,279,122 | A * | 7/1981 | Rogers | 59/10 |
| 6,105,357 | A * | 8/2000 | Weinberg | 59/35.1 |
| 6,883,300 | B2 * | 4/2005 | Sanders | 59/78.1 |
| 8,528,311 | B1 * | 9/2013 | Messler | 59/78.1 |

* cited by examiner

*Primary Examiner* — David B Jones

(57) ABSTRACT

Hollow ornaments in the form of closed links with ornamental and functional openings for producing rings, earrings, pendant bangles necklaces or bracelets and in the form of continuous array of closed links with functional and ornamental openings, which are joint free; and process for producing them.

7 Claims, 8 Drawing Sheets

HOLLOW ORNAMENTS AND PROCESS FOR PRODUCING THEM

FIELD OF THE INVENTION

The present invention relates to hollow ornaments in the form of closed links in the shapes of bracelets and rings, and their arrays, and process of producing them.

OBJECTIVE

The objective is to invent hollow jewellery in the form of bracelets, bangles, necklaces rings, earring, pendant and chains and a process of producing hollow jewellery.

Another objective is to invent a process of producing hollow jewellery in the form of array of links which are passing through one another and yet are free from joints and thus are free from joining marks normally unavoidable in making chains or arrays of links.

BACKGROUND OF THE INVENTION

Jewelry manufacturing has the challenge of aesthetics and finish besides robustness and other manufacturing issues. The processes used are by and large same as those used for any metal work of intricate shape. Investment casting is one of the most common techniques deployed for jewellery manufacture in volumes. U.S. Pat. No. 1,398,706 describes this.

Jewelry is worn for ornamental purpose and weight of jewelry is often a detrimental aspect for two reasons—it makes the wearer feel the weight and also increases the cost without really adding value.

Hollow jewelry therefore becomes a natural choice. One such hollow jewellery is disclosed in Patent Application No: 2024/MUM/2008. Hollow jewellery solves both problems—weight as well as cost, however producing hollow jewellery has the compounded challenge of maintaining aesthetics, finish and robustness. Particularly the ugly trail of the welding joint of the components reduces the ornamental value and therefore acceptability significantly.

Jewelry products like Chains and continuous links need to be assembled by interlinking and joints are detrimental here again. Patent BG66006B1 (Publication Number) describes such processes which involves several mechanical operations and skill.

Production of Jewelry which is hollow as well as continuous has to meet all the challenges. Our inventiveness lies in minimal mechanical operations leading to high quality jewellery with consistent finish.

STATEMENT OF INVENTION

Our invention is hollow ornaments and the process to produce them so that there are neither cuts nor joints on the closed links or the array of closed links.

The links of the array of hollow jewellery have ornamentally designed functional openings through which filler material can be filled in and out to achieve the hollowness.

The jewelry is in precious metal which is made by casting in pattern of refractory material. The pattern is made by using low melting point soft material which is directly obtained from computer generated model.

DETAILED DESCRIPTION OF INVENTION

Figure 1:
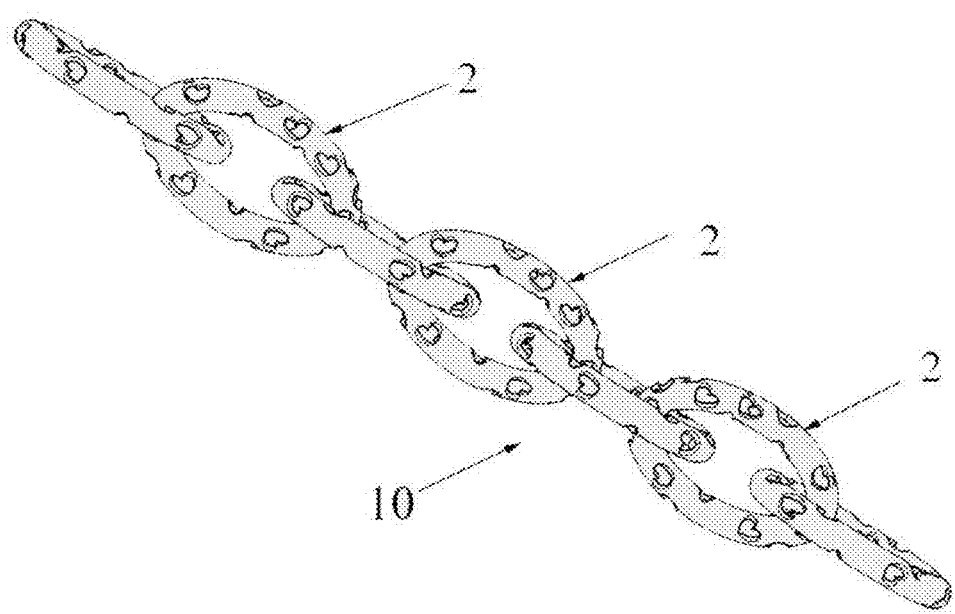
FIG. 1 shows the jewelry in the shape of array of links producible from this process.
Figure 2:
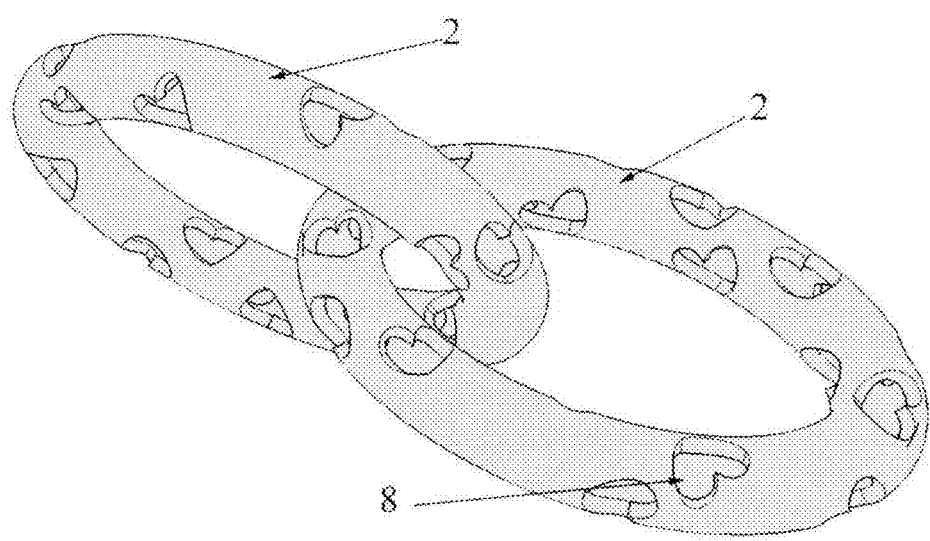
FIG. 2 shows a typical embodiment of individual links with functional and ornamental openings; and relative placement in CAD
Figure 3:
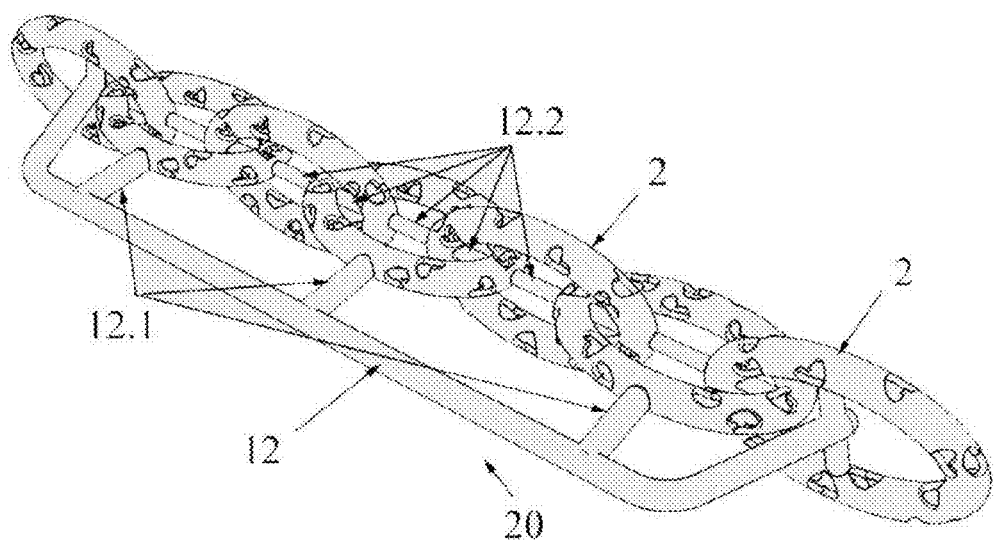
FIG. 3 shows the array of closed links (whether in model form, in wax or in cast metal) having support network with plurality of interconnections constraining movement of individual closed links w.r.t. one another.
Figure 4:
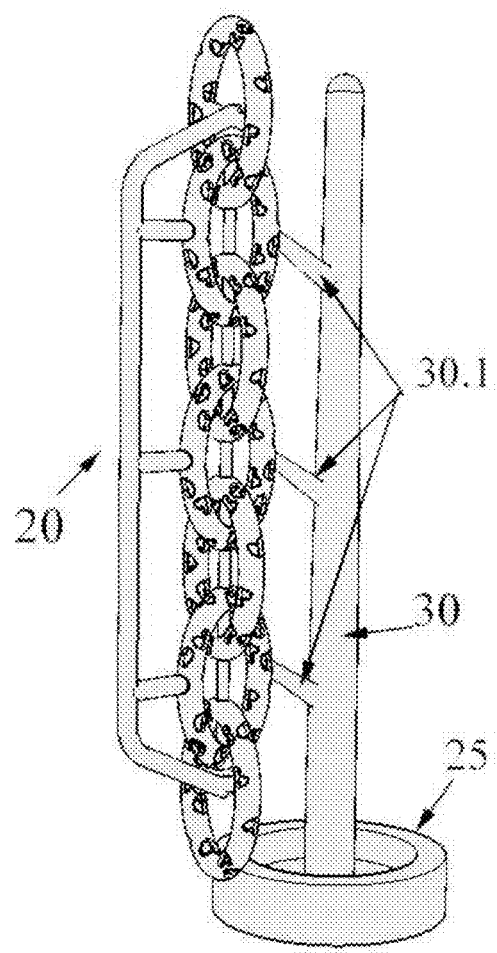
FIG. 4 shows the tree of plurality of hollow model of jewellery in soft material of low melting point.
Figure 5:
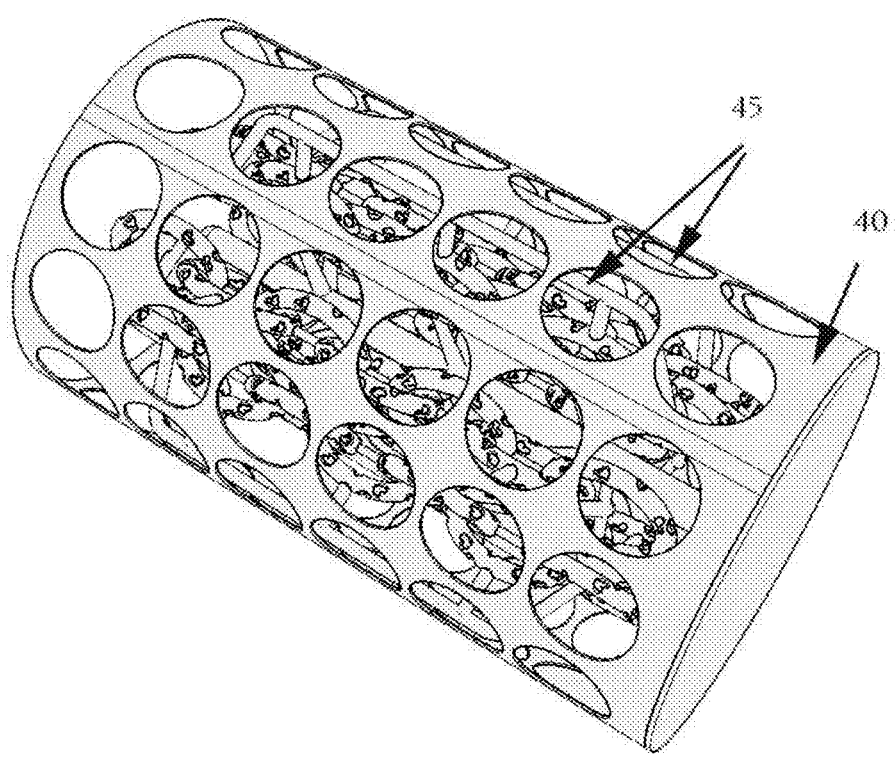
FIG. 5 shows the tree in casting flask.
Figure 5A:
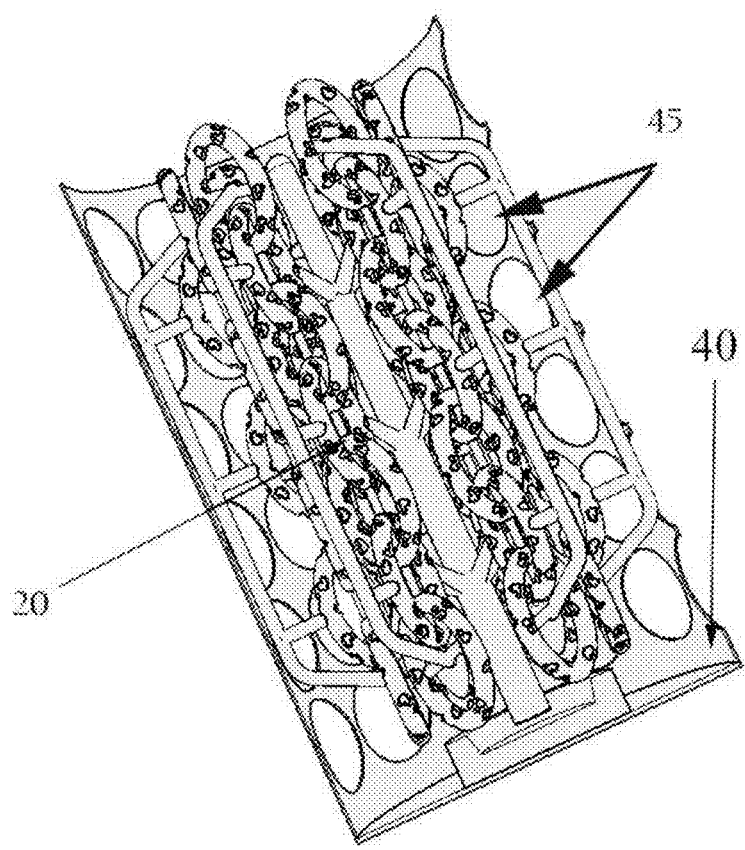
FIG. 5A shows a sectional view of the casting flask.
Figure 6:
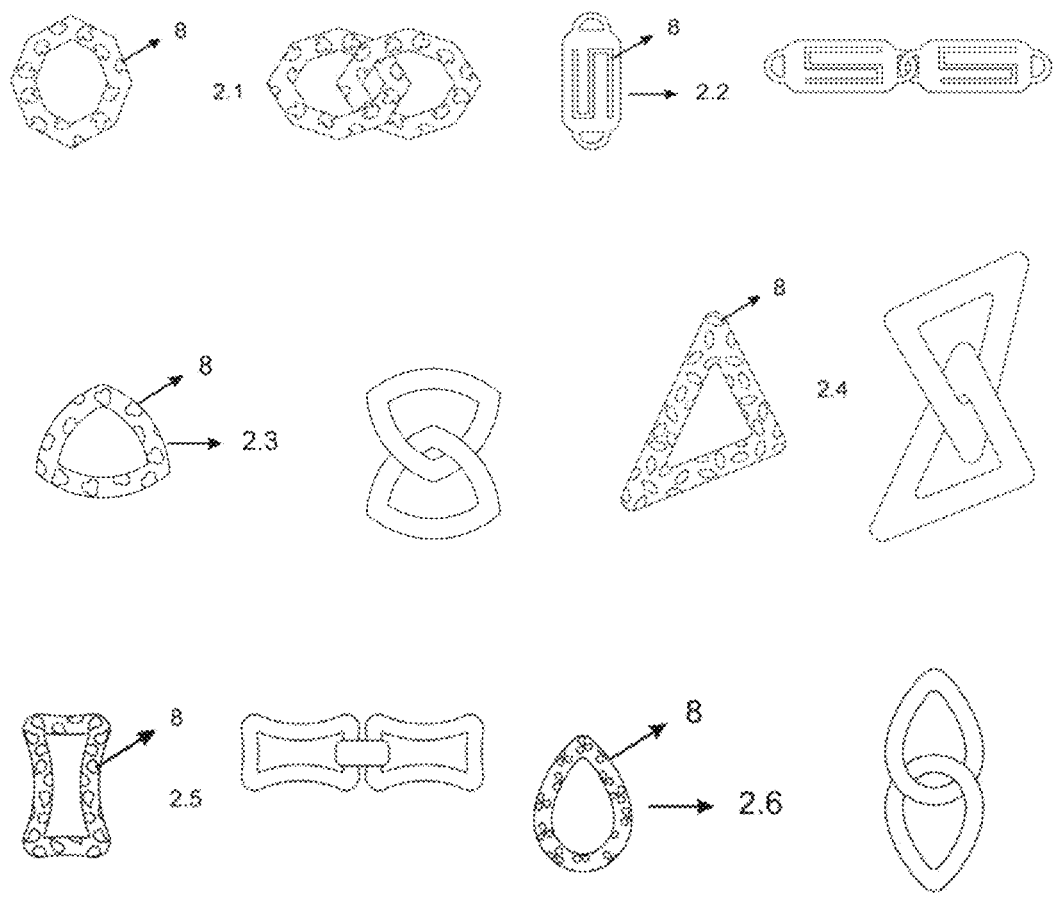
FIG. 6 shows different illustrative shapes of discrete closed links with functional and ornamental openings.

The preferred embodiment of jewellery as per our invention is now being described with the help of drawings. It is to be noted that virtually unlimited number of shapes can be created using the concept of this invention and therefore no shape described here is to be misconstrued as limiting the invention.

The chain (10) with several links (2) is firstly drawn on computer aided design (CAD) systems dealing in three dimensional modeling, to produce virtual model identical in shape and thickness. There are several such design systems available, Rhino, ProE, CATIA, AutoCAD, Solidworks etc. are just to cite few.

Every link (2) is modeled with required outer shape and dimension and required thickness. Each link is close in shape and therefore does not have start or end. Several openings (8) are made in each link which are either artistic shape or regular or irregular geometrical shapes. These openings (8) are of significance in the process of producing jewellery as shall follow.

The links (2) is assembled virtually on the CAD systems in the required array form and this is possible since these are virtual links and therefore pass through one another without material obstruction.

Further, connectors (12.2) are modeled between the insides of the links. Main support (12) is modeled between first and last link and supports (12.1) are modeled on every link modeled and assembled transverse i.e. substantially at 90 degrees w.r.t. first and last link. The cross-section and dimensions of main support (12), supports (12.1) and connectors (12.2) are derived such that the chain (10) maintains the shape even when cast in metal, particularly precious metals like gold, silver, platinum, bronze.

The CAD systems are capable of producing output in different forms like print binary or drawing exchange format (DXF) or stereo lithographic format (STL). STL format is the format usable as an input to three dimensional (3D) printing machines. 3D printing machines are known to "print" i.e. produce the CAD model using materials which have low melting point—like wax, polyethylene, Acrylonitrile butadiene styrene (ABS). Our inventive process also requires low surface hardness and therefore physical solid model (20) is obtained by inputting wax or equivalent material.

The physical solid model is adequately hard to retain the complete shape. Diamonds or precious stones are pushed into the surface of links (2) and the diamonds or stones stay there as they are eventually required to, in the jewellery in precious metal, since wax or equivalent material displaces itself and holds the diamonds or precious stones by ingressing onto the edges all around the diamond or precious stone and into any ridges in them.

Plurality of such solid models (20) are grouped together using anchors (30.1) around pillar (30) which is erected in a rigid base (25). This formation is installed in a casting flask (40) of metal with big holes (45) all around. The holes (45) are initially temporarily closed by wrapping a thin plastic film coated with adhesive so as to keep the plastic film in its place.

The casting flask (40) is filled with gypsum plaster, also known as plaster of Paris, lime plaster, or cement plaster or equivalent material which has refractory properties i.e. it should be able to withstand upto 1000° C. temperature without scorching or burning away and should not produce fumes when heated.

The refractory material is filled in low viscosity form by making its dilute solution in water such that it can completely fill in the hollow part of every link through openings (8) provided.

After the refractory material solidifies, the casting flask is heated so as to melt away the material used for making solid model (20).

Precious metal in the molten form is poured in the casting flask and plurality of jewellery (20) is obtained, with diamonds and precious stones studded robustly.

The plurality of jewellery (20) is separated from the pillar (30) by manually cutting away the anchors (30.1). Next, main support (12) and supports (12.1) are manually cut away. Lastly, all connectors (12.2) are manually removed.

This results into links freeing themselves and therefore the hollow jewellery in the form of array of links free from any joints.

The array of links can be made using any shape of closed links (2.1, 2.2, 2.3, 2.4, 2.5, 2.6 . . . are just few of the unlimited possible shapes).

Likewise, the process is usable in the manner described above, for mass producing discrete closed links, rings, earrings, pendant bangles necklaces or bracelets or by whatever name it might be known.

Figure 7:
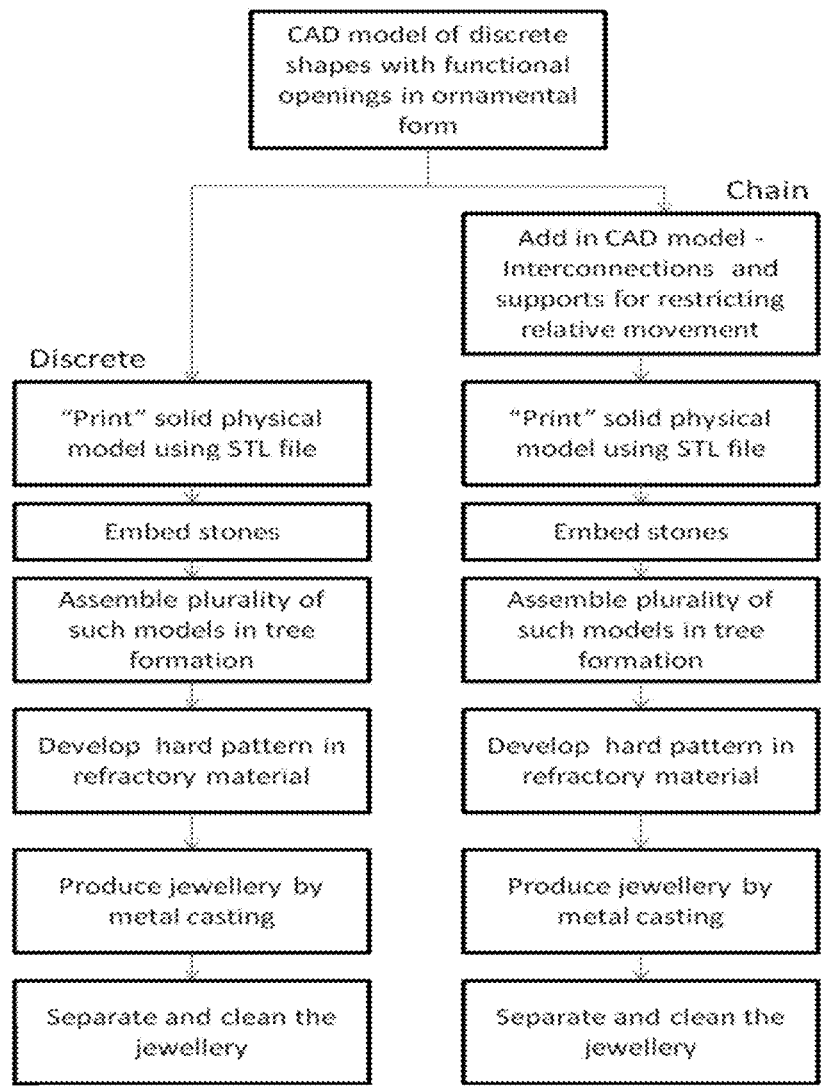
FIG. 7 shows the flowchart of the complete process of producing Hollow ornaments.

FIG. 7 describes the Process in the form of a flowchart.

I claim:

1. A hollow ornament, comprising of:
    a closed link with ornamental and functional openings, are joint free and have a surface;
    said closed link having an outer shape and a thickness; and
    a stone held onto the surface of the each of the closed links.

2. A hollow ornament, comprising of:
    a continuous array of closed links passing through one another, each of the closed links having ornamental and functional openings, are joint free and have a surface;
    said closed links having an outer shape and a thickness; and
    a stone held onto the surface of the each of the closed links.

3. A process for producing a hollow ornament in the form of a closed link and a continuous array of closed links passing through one another, with ornamental and functional openings, characterizing the steps of:
    a) developing a hollow model with a support network with a computer aided design (CAD) system;
    b) developing a hollow model with a support network from a soft material having a low melting point using the hollow model from the computer aided design (CAD) system;
    c) grouping the hollow model having the support network in the soft material using an anchor around a pillar having a rigid base, into a casting flask;
    d) filling a castable refractory material into the casting flask having a grouped hollow model with the support network in the soft material;
    e) solidifying the castable refractory material in the form of the grouped hollow model with the support network;
    f) supplying heat to the casting flask having the grouped hollow model in the soft material;
    g) melting away the soft material, developing a pattern of the grouped hollow model in the castable refractory material;
    h) casting the hollow ornament from the pattern of the grouped hollow model with the support network in the castable refractory material using a molten metal; and
    i) separating the support network from the hollow ornament.

4. The process as claimed in claim 3, wherein the developing the hollow model in the computer aided design (CAD) system is for direct readability into a 3D printing machine.

5. The process as claimed in claim 3, wherein the producing of the hollow ornament further involves constraining the movement of each of the closed link of the hollow model in the soft material, the movement of each of the closed link of the hollow model in the castable refractory material and the movement of each of the closed link of the hollow ornament, from one another, using the support network.

6. The process as claimed in claim 3, wherein the filling of the castable material causes soaking of the pattern of the hollow model with the support network with a fluid refractory material of a low viscosity so as to fill in an inside of the closed links and the continuous array of closed link through the ornamental and functional openings.

7. The process as claimed in claim 3, wherein the separating the support network involves manual removal of an interconnection.

\* \* \* \* \*